United States Patent [19]

Klein et al.

[11] 4,233,639
[45] Nov. 11, 1980

[54] APPARATUS AND SYSTEM FOR PROTECTING POWER DISTRIBUTION CIRCUITS AGAINST GROUND FAULTS

[75] Inventors: Keith W. Klein, Simsbury; Joseph M. Palmieri; Gregory C. Eckart, both of Southington, all of Conn.

[73] Assignee: General Electric Company, New York, N.Y.

[21] Appl. No.: 24,228

[22] Filed: Mar. 26, 1979

[51] Int. Cl.³ .......................................... H02H 3/347
[52] U.S. Cl. ........................................ 361/44; 361/46
[58] Field of Search ............................ 361/42, 44–50, 361/115, 332; 335/18

[56] References Cited

U.S. PATENT DOCUMENTS

| | | | |
|---|---|---|---|
| 3,787,708 | 1/1974 | Hobson, Jr. | 361/44 |
| 3,789,268 | 1/1974 | Klein | 361/45 |
| 4,044,395 | 8/1977 | Eckart | 361/44 |
| 4,156,884 | 5/1979 | Eckart et al. | 361/46 |

Primary Examiner—Harry E. Moose, Jr.
Attorney, Agent, or Firm—Robert A. Cahill; Walter C. Bernkopf; Philip L. Schlamp

[57] ABSTRACT

A ground fault circuit interrupting (GFCI) device is utilized to control either an industrial circuit breaker or a contactor in protecting a large power distribution circuit against ground faults. The GFCI device is equipped with switch contacts which are actuated incident with tripping of the GFCI device. The switch contacts control energization of an actuator adapted to the circuit breaker or contactor. A ground fault sensor responds to ground faults on the distribution circuit by injecting a current imbalancing signal into the GFCI device, causing it to trip. The consequent switch contact actuation initiates operation of the circuit breaker or contactor to interrupt the distribution circuit.

8 Claims, 3 Drawing Figures

APPARATUS AND SYSTEM FOR PROTECTING POWER DISTRIBUTION CIRCUITS AGAINST GROUND FAULTS

BACKGROUND OF THE INVENTION

Ground fault protection for personnel and electrical equipment is an ever increasing concern in both home and industry. For residential circuit applications, ground fault circuit interrupting (GFCI) devices are now widely available in compact circuit breaker and receptacle configurations for convenient installation in existing service entry equipment and wall receptacle boxes. These GFCI devices are primarily intended to protect people from the hazards of electrical shock caused by leakage current emanating from ground faults, however they do afford a measure of equipment protection in terms of acting to halt ground fault current which can cause fires.

For high current applications found in industry, ground fault protection is available in basically two configurations. With the event of so-called "static trip" circuit breakers, it has become economically possible to combine overcurrent and ground fault signal processing circuitry in a compact electronic trip unit package which can be integrated with the circuit breaker to achieve comprehensive circuit protection. Alternatively, traditional industrial circuit breakers having thermal-magnetic and dual-magnetic trip units for overcurrent protection can be utilized with so-called "ground fault relays" in providing ground fault protection as well. These relays respond to a ground fault signal developed by a suitable sensor, such as a zero sequence transformer coupled with the load carrying conductors, by energizing (or de-energizing) a solenoid which, in turn shunts trips the breaker to initiate circuit interruption.

U.S. Pat. No. 4,044,395, issued Aug. 23, 1977 assigned to the assignee of the instant application, discloses a system for protecting relatively large power distribution circuits against ground faults by utilizing as its principle operating component a conventional GFCI device normally used in low power, residential circuit applications. As disclosed and claimed therein, the GFCI device is installed in a control circuit for an undervoltage release solenoid adapted to a conventional circuit breaker protecting the distribution circuit or in the control circuit for the holding coils of a contractor operating in the distribution circuit. A ground fault sensor in the form of a zero sequence transformer coupled with the load current carrying conductors of the distribution circuit develops a current signal in its secondary winding in response to a ground fault on the distribution circuit. This current signal is injected into one side of the control circuit to create a current imbalance of the nature to which the GFCI device is responsive. The GFCI device trips to interrupt the control circuit, and the undervoltage release solenoid drops out to trip the circuit breaker or the holding coil becomes de-energized to open the contactor. In either case, the distribution circuit is interrupted to clear the ground fault.

It is an object of the present invention to provide an inexpensive ground fault protection system suitable for high current, industrial circuit applications.

An additional object of the present invention is to provide a ground fault protection system of the above character which is adaptable to different types of industrial circuit current interrupters.

A further object of the present invention is to provide a ground fault protection system of the above character, wherein the ground fault circuit interrupting (GFCI) device is equipped with both normally open and normally closed switch contacts individually capable of functioning to control the operation of current interrupting devices in interrupting an industrial circuit pursuant to clearing a ground fault thereon.

Other objects of the invention will in part be obvious and in part appear hereinafter.

SUMMARY OF THE INVENTION

In accordance with the present invention, there is provided a ground fault protection system ideally suited for application to high current, high voltage power distribution circuits, wherein the system utilizes as its principle operating component a modified ground fault circuit interrupting (GFCI) device of the type used in low voltage residential-type circuits. As is well known, such GFCI devices utilize a differential current transformer to sense imbalances in the currents flowing through separate primary windings thereof enroute to and returning from a load, as would be occasioned by leakage current returning to the source through an unintended ground path. The differential current transformer develops a secondary winding analog signal proportional to this leakage current which is processed by electronic circuitry, and, if of a predetermined magnitude and duration, an electronic switch is triggered to complete an energization circuit for a solenoid. Upon energization, the solenoid plunger strikes a latch to release a latch to release a spring powered mechanism which is freed to open normally closed GFCI device contacts, clearing the ground fault through which the leakage current originates.

In accordance with the present invention, the GFCI device is equipped with two circuit breaker poles and a normally open switch which is actuated incidentally with the tripping open of the breaker contacts in each of the breaker poles.

To sense the existence of a ground fault on the distribution circuit, a ground fault sensor is coupled with the load current carrying conductors of the distribution circuit for developing a voltage signal indicative of the ground fault current magnitude. This voltage signal is utilized to produce a current signal flowing through one of the differential current transformer primary windings, thereby creating a current imbalance sensible by the differential current transformer of the GFCI device. The GFCI device trips, opening both contacts and actuating the switch. If the industrial circuit interrupting device is a circuit breaker equipped with an undervoltage release (UVR) solenoid or a contactor, the UVR solenoid or the contactor holding coil energization circuit is wired through the normally closed breaker contacts, such that, when the GFCI device trips, the energization circuit is interrupted to, in turn, initiate interruption of the industrial circuit. If the industrial circuit interrupting device is a circuit breaker equipped with a shunt trip solenoid, the energization circuit therefor is wired through the normally open switch, such that, when the GFCI device trips, the switch closes to complete this energization circuit to, in turn, initiate interruption of the industrial circuit.

As an incidental, but nevertheless significant feature of the present invention, the control power circuit energizing the GFCI device may be utilized to power loads connected downstream therefrom. Such loads may include alarms, signal lights, etc. traditionally found in motor control centers, for example. Since these loads are wired through the GFCI device differential current transformer primary windings, they are afforded ground fault protection, a significant advantage in terms of operating personnel safety.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which:

FIG. 1 is a simplified, diagrammatic plan view of a ground fault circuit interrupting (GFCI) device constructed in accordance with the present invention;

FIG. 2 is a circuit schematic diagram, partially in block form, depicting the GFCI device of FIG. 1 as utilized in a power distribution circuit ground fault protection system of the present invention; and FIG. 3 is a circuit schematic diagram, partially in block form, depicting the GFCI device of FIG. 1 as utilized in an alternative power distribution circuit ground fault protection system of the present invention.

Corresponding reference numerals refer to like parts throughout the several views of the drawing.

DETAILED DESCRIPTION

Figure 1:
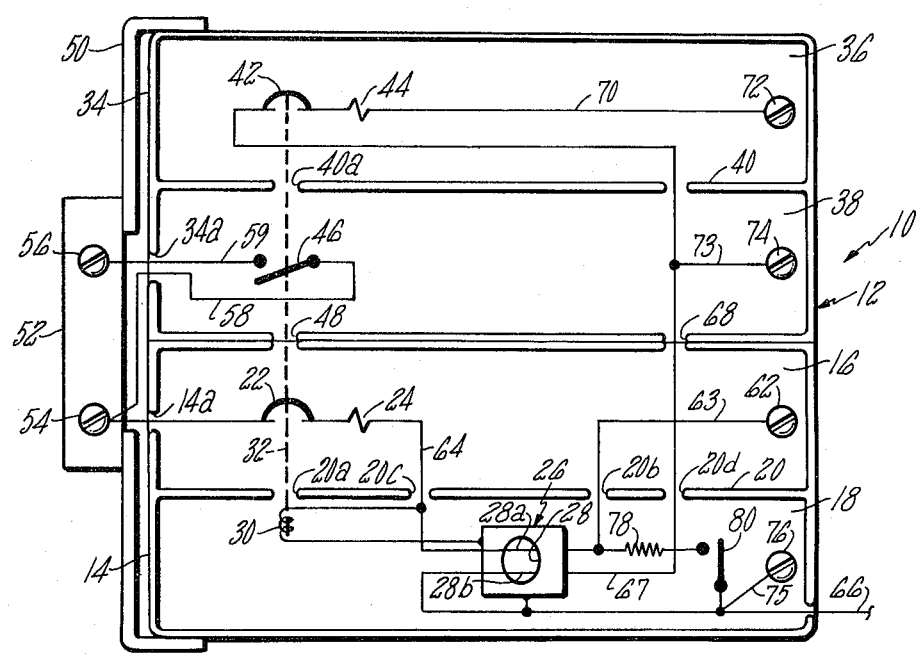

Referring to FIG. 1, the ground fault circuit interrupting (GFCI) device of the present invention, generally indicated at 10, includes a slightly modified, residential ground fault interrupting circuit breaker, generally indicated at 12. This circuit breaker is housed in a molded case 14 having a pair of side-by-side compartments 16 and 18 separated by a common partition 20, all as disclosed in commonly assigned, U.S. Pat. No. 3,789,268; the disclosure of which being specifically incorporated herein by reference. Thus, compartment 16 contains a circuit breaker pole consisting of a conventional operating mechanism (not shown) for contacts 22 and conventional thermal-magnetic trip elements, schematically indicated at 24. This circuit breaker pole may be of the one-half inch wide type disclosed in commonly assigned U.S. Pat. No. 3,464,040. Compartment 18 of molded case 14 contains a ground fault module, generally indicated at 26, consisting of a differential current transformer 28 and electronics, such as disclosed in commonly assigned U.S. Pat. No. 3,953,766, for processing differential current transformer secondary winding output signals indicative of a current imbalance in the two single-turn primary windings 28a and 28b thereof.

If this secondary winding output signal exceeds a predetermined threshold level, module 26 effects energization of a solenoid 30, also included in compartment 18, whose plunger acts on an internal trip bar, schematically indicated at 32. This trip bar extends through an opening 20a in partition 20 into compartment 16 where it acts to mechanically trip contacts 22 open.

GFCI device 10 also includes a second molded case 34 identical to and ganged with case 14 by rivets (not shown). Thus, this second case includes a pair of side-by-side compartments 36 and 38 separated by a common partition 40. Compartment 36 contains a circuit breaker pole, preferably identical to the breaker pole in compartment 16, consisting of an operating mechanism (not shown) for contacts 42 and thermal-magnetic trip elements, schematically indicated at 44. Compartment 38 of case 34 contains a normally open switch 46. Common trip bar 32 is extended through registered openings 48 in the abutting sidewalls of cases 14 and 34 into operatively coupled relation with switch 36 in compartment 38 and through opening 40a in partition 40 into compartment 36 where it acts to mechanically trip contacts 42 open. It is thus seen that when solenoid 30 in compartment 18 is energized under the control of ground fault module 26, normally closed breaker contacts 22 and 42 are tripped open and normally open switch 46 is closed, all via the internal common trip bar 32. This switch may be a bell alarm switch physically adapted to a residential circuit in the manner disclosed in commonly assigned U.S. Pat. No. 3,256,407 so as to be actuated to its closed condition only in response to tripping of the circuit breaker. Alternatively, the switch 46 may be an auxillary switch physically adapted to a residential circuit breaker in the manner taught in commonly assigned, copending Klein, et al application Ser. No. 940,417, filed Sept. 7, 1978, such that it is closed in response to the circuit breaker being either tripped open or manually opened. It will be appreciated that the breaker poles in compartments 16 and 36 are each equipped with conventional manual operating handles accessible externally of molded cases 14 and 34 and ganged together for concerted operation by an external handle tie (not shown).

Still referring to FIG. 1, a bracket 50 is affixed to the left or line end of GFCI device 10 to, in turn, mount a terminal block 52 equipped with two external screw terminals 54 and 56. The former is connected to a lead 58 which runs through an open 34a in case 34 to one side of switch 46, while terminal 56 is connected by a lead 59 running through case opening 34a to the other side of this switch. Terminal 54 is also connected to one side of breaker contacts 22 via a lead 60 extending through an opening 14a in case 14. Completing this breaker internal pole circuit, contact 22 is connected to an external screw terminal 62 via thermal-magnetic trip elements 24, lead 64 running from compartment 16 into compartment 18 through opening 20c in partition 20, transformer primary winding 28a, and a lead 63 running from compartment 18 back into compartment 16 through partition opening 20b. A pigtail lead 66 entering compartment 18 through opening 14b in case 14 is connected to one end of transformer primary winding 28b. The other end thereof is connected by a lead 67 extending through partition opening 20d, compartment 16, registered openings 68 in the abutting sidewalls of cases 14 and 34, compartment 38, and opening 40b in partition 40 into compartment 36 to one side of breaker contacts 42 therein. The other side of these contacts are connected via thermal-magnetic trip elements 44 and lead 70 to external screw terminal 72, thereby completing a second breaker internal pole circuit. Leads 64 and 66 are also connected to supply operating power to ground fault module 26, the former through solenoid 30. Lead 67 is connected by a lead 73 to external screw terminal 74, while lead 66 is connected by a lead 75 to external screw terminal 76 so as to be electrically common. Terminals 62 and 76 respectively correspond to the load power and load neutral terminals when case 14 houses an unmodified, residential ground fault circuit breaker. The same is true for terminals 72 and 74 of case 34. Completing the description of FIG. 1, the junction between lead 63 and transformer primary winding 28a is connected via a resistor 78 and a normally open test switch 80 to electrically common lead 66 and terminal 76. As is well understood in the art, closure of switch 80 creates a current imbalance in the current transformer primary windings slightly in excess of the predetermined threshold level, whereupon ground fault circuit breaker 12 will trip if functioning properly.

Figure 2:
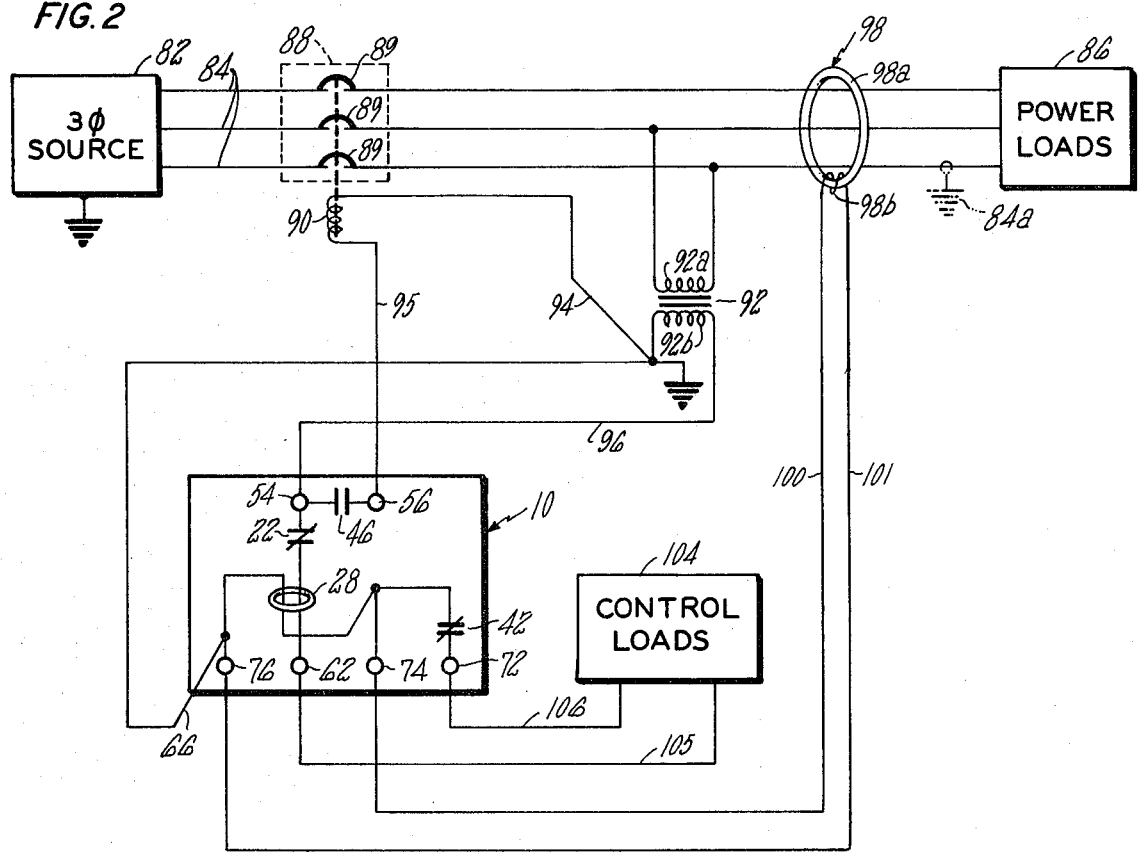

Turning to FIG. 2, the ground fault protection system of the present invention utilizing the GFCI device 10 of FIG. 1 is depicted in its application to a high voltage, industrial-type electrical distribution circuit including a grounded neutral source 82 supplying three-phase power over phase or line conductors 84 to a load 86. Included in this distribution circuit is a conventional three-pole circuit breaker, generally indicated at 88, having separable contacts 89 connected in series with each line conductor 84. Operatively associated with circuit breaker 88 in a well known manner is shunt trip solenoid 90. As is well understood in the art, a shunt trip solenoid in its adaptation to a circuit breaker is normally de-energized, but when it is desired to trip the circuit breaker, its coil is energized. Its plunger is magnetically attracted from an inactive to an actuated position, in the process striking a latch associated with the circuit breaker trip unit. The latch releases the breaker mechanism which operates under the power of a mechanism spring to abruptly open the breaker contacts.

A voltage step-down transformer 92 includes a primary winding 92a connected to be energized across two of the line conductors 84 of the power distribution circuit. One side of the secondary winding 92b of this transformer, serving as a 120 VAC control power source, is grounded and also connected to GFCI device 10 via lead 66. In addition, this grounded side of the transformer secondary is connected via lead 94 to one side of shunt trip solenoid 90, the other side of which being connected via lead 95 to terminal 56 of GFCI device 10. The other or line side of transformer secondary 92b is connected to terminal 54 of GFCI device 10 via lead 96.

To sense a ground fault on the distribution circuit downstream from circuit breaker 88, a ground fault sensor, generally indicated at 98 and typically a zero sequence transformer is, utilized. Thus, as illustrated in FIG. 2, sensor 98 comprises a toroidal core 98a which embraces the three line conductors 84 of the distribution circuit. As long as the vectorial sum of the currents flowing in these three line conductors equals zero, the net flux induced in core 98a is also zero and no voltage is induced on its multi-turn secondary winding 98b, which is connected via leads 100 and 101 across terminals 74 and 76 of GFCI device 10. It is seen that in the absence of an induced voltage in the sensor secondary winding, there is no voltage impressed across terminals 74 and 76. On the other hand, if a ground fault should exist on the distribution circuit, such as illustrated at 84a, the vectorial sum of the currents in line conductors 84 no longer equals zero, and a voltage is induced in secondary winding 98b. This induced voltage, as impressed across GFCI device terminals 74, 76, will produce, as seen in FIG. 1, a current which flows through lead 73, lead 67, differential current transformer primary winding 28b, the internal portion of lead 66 and lead 75. The differential transformer is thus unbalanced, resulting in the opening of breaker contacts 22 and the closing of switch 46. It is thus seen that an energization circuit for shunt trip solenoid 90 from transformer secondary 92b is thus completed to effect opening of breaker contacts 89 and interruption of the distribution circuit.

While the distribution circuit is illustrated as simply a three phase, three wire circuit, it will be appreciated that it may also include a fourth, neutral wire, in which case all four wires would be embraced by core 98a. Moreover, the sensor 98 may be constituted by separate current transformers inductively coupled with each distribution circuit wire and with their secondary windings connected in parallel, residual circuit fashion.

As an additional feature of the present invention, the control power source, transformer secondary 92b, is utilized to power an electrical load 104 connected via leads 105 and 106 to terminals 62 and 72 of GFCI device 10. This load may include indicator lights, alarms, and other devices as may be incorporated in typical industrial electrical power delivery installations. From FIG. 1 and 2, it is seen that this load is fed from transformer secondary 92b over an energization circuit which includes, as its line side, lead 96, terminal 54, lead 60, breaker contacts 22, thermal magnetic trip elements 24, lead 64, differential transformer primary winding 28a, lead 63, terminal 62 and lead 105. The neutral side of this energization circuit includes lead 66, differential transformer primary winding 28b, lead 67, breaker contacts 42, thermal-magnetic trip elements 44, lead 70, terminal 72 and lead 106. Thus, any ground fault on this circuit downstream from GFCI device 10 will unbalance differential transformer 28, whereupon breaker contacts 22 and 42 are tripped open to interrupt both the line and neutral sides thereof. Coincidentally, switch 46 is closed to initiate tripping of industrial circuit breaker 88. Consequently, GFCI device 10, in addition to affording equipment ground fault protection for the distribution circuit loads 86, provides personnel ground fault protection on the control loads and the downstream energization circuit therefor.

Figure 3:
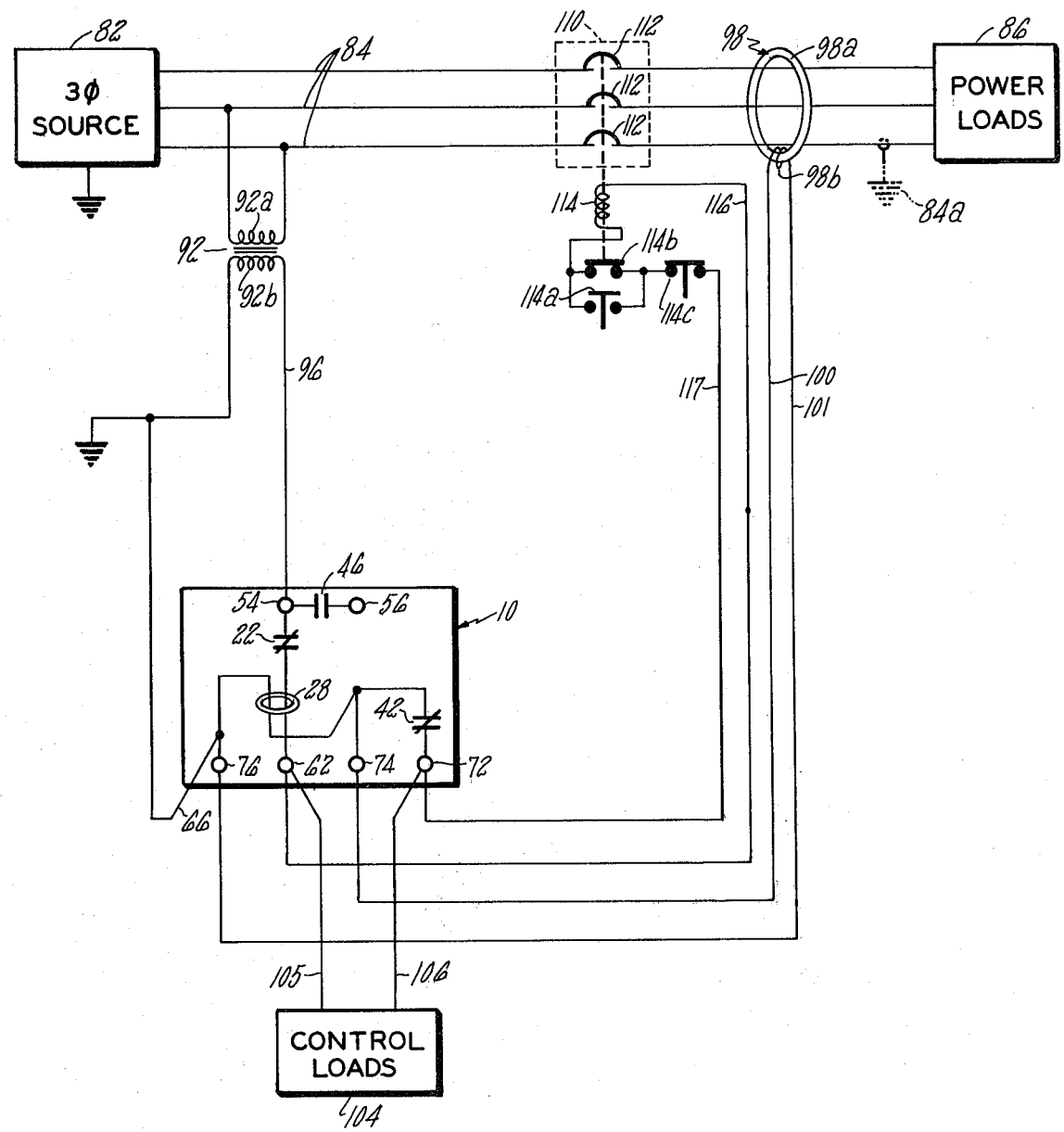

FIG. 3 discloses an alternative ground fault protection system which accommodates, instead of a shunt trip circuit breaker, a distribution circuit current interrupter in the form of a contactor 110 having contacts 112 connected in series with each line conductor 84. This contactor includes a typical contact operating circuit consisting of a holding coil 114, a start pushbutton switch 114a, sealing switch contacts 114b and a stop pushbutton switch 114c. This contact operating circuit is connected via leads 116 and 117 across terminals 62 and 72 of GFCI device 10. Control power voltage step-down transformer 92 has its primary winding 92a fed from line conductors 84 at a point upstream from contactor 110. The grounded or neutral side of secondary winding 92 is connected to lead 66 of GFCI device 10, while the line side of the secondary winding is connected via lead 96 to GFCI device terminal 54, as in the system embodiment of FIG. 2. In the embodiment of FIG. 3 however, no connection is made to terminal 56 since switch 46 is not utilized. The two sides of zero sequence, differential current transformer secondary winding 986 are connected via leads 100 and 101 across terminals 74 and 76, again as in the embodiment of FIG. 2.

From FIGS. 1 and 3, it is seen that contactor holding coil 114 is energized from the control power transformer secondary winding 92b through the normally closed breaker contacts 22 and 42 to maintain its contacts 112 closed. When a ground fault occasioned voltage is induced in ground fault sensing transformer secondary winding 98b, the voltage developed across terminals 74 and 76 causes an unbalancing current to flow through differential transformer primary winding 28b. Breaker contacts 22 and 42 are tripped open, thereby interrupting the energization circuit for holding coil 114 which drops out to open contacts 112 of contactor 110. It will also be noted that the two sides of the hold coil energization circuit serially include the differential transformer primary windings 28a and 28b, and thus, personnel ground fault protection is offered that portion of this energization downstream from GFCI device 10, just as are any control loads 104 also connected across GFCI device terminals 62 and 72.

It will be further appreciated that contactor 110 can be replaced by a circuit breaker in the system of FIG. 3 when equipped with an undervoltage release (UVR) solenoid energized through the GFCI device in the same manner as holding coil 114. Moreover, the GFCI device 10 and the various loads energized therethrough may be powered from a separate 120 VAC source rather than from the distribution circuit via transformer 92.

While switch 46 has been disclosed as being a normally open switch which is closed in response to a power distribution circuit ground fault to complete an energization circuit for a shunt trip solenoid, it will be appreciated that this switch may be a normally closed switch which can be utilized in place of breaker contacts 22, 42 to drop out an undervoltage release solenoid or a contactor holding coil in effecting ground fault clearing power circuit interruption.

It will thus be seen that the objects set forth above, among those made apparent in the preceding description, are efficiently attained and, since certain changes may be made in the above construction without departing from the scope of the invention, it is intended that all matter contained in the above description as shown in the accompanying drawings shall be interpreted as illustrative and not in a limiting sense.

Having described our invention, what we claim as new and desire to secure by Letters Patent is:

1. A ground fault circuit interrupting (GFCI) device for utilization in a system protecting an electrical power distribution circuit against ground faults, said GFCI device comprising, in combination:
   A. a first circuit breaker including:
      (1) a molded case,
      (2) first breaker contacts disposed in said first breaker molded case and serially connected in a first breaker internal pole circuit extending between first and second externally excessible GFCI device terminals,
      (3) a trip solenoid disposed in said first breaker molded case and electrically connected with said first breaker pole circuit,
      (4) a ground fault module electrically connected with said first breaker pole circuit and said solenoid, said module disposed in said first breaker molded case and including a differential current transformer having first and second primary windings, said first primary winding serially connected in said first breaker pole circuit, said module operable to initiate actuation of said solenoid in response to an imbalance in the currents flowing in said first and second differential transformer primary windings;
   B. a second circuit breaker having
      (1) a molded case ganged together in side-by-side relation with said first breaker molded case,
      (2) second breaker contacts disposed in said second breaker molded case and serially electrically connected with said second differential transformer primary winding in a second breaker internal pole circuit extending between said first and second breaker molded cases from a third externally excessible GFCI device terminal to a fourth externally excessible GFCI device terminal, said second breaker pole circuit also connected to said module, and
      (3) a switch disposed in said second breaker molded case and electrically connected in series between said first GFCI device terminal and a fifth externally excessible GFCI device terminal;
   C. an internal common trip bar extending between said first and second breaker molded cases, said common trip bar operatively coupling said trip solenoid with said first and second breaker contacts and said switch such that actuation of said solenoid trips said first and second breaker contacts open and actuates said switch;
   D. a sixth externally excessible GFCI device terminal electrically connected to said second breaker pole circuit at a point intermediate said second breaker contacts and said second differential transformer primary winding.

2. The ground fault circuit interrupting (GFCI) device defined in claim 1, wherein said first breaker molded case comprises first and second side-by-side compartments, said first breaker contacts disposed in said first compartment, and said trip solenoid and ground fault module disposed in said second compartment.

3. The ground fault circuit interrupting (GFCI) device defined in claim 2, wherein said second breaker molded case is identical to said first breaker molded case such as to also comprise first and second compartments, said second breaker contacts disposed in said first compartment of said second breaker molded case and said switch disposed in said second compartment thereof.

4. The ground fault circuit interrupting (GFCI) device defined in claim 3, wherein said first and fifth terminals are included in a terminal block secured to one end of said GFCI device, said second and fourth terminals are mounted by said first breaker molded case at the opposite end of said GFCI device, and said third and sixth terminals are mounted by said second breaker molded case at said opposite end of said GFCI device.

5. A power distribution circuit ground fault protection system utilizing the ground fault circuit interrupting (GFCI) device of claims 1, 2, 3 or 4; comprising, in combination:
   A. a source of control power connected across said first and fourth GFCI device terminals;
   B. a circuit interrupting device connected in the power distribution circuit;
   C. an actuator operable to initiate power circuit interrupting operation of said interrupting device, said actuator electrically connected across said fourth and fifth GFCI device terminals for energization from said control power source through said switch; and
   D. a sensor coupled with the power distribution circuit for developing a signal voltage across said fourth and sixth GFCI device terminals in response to a ground fault on the power distribution circuit, said signal voltage producing a current through said second primary winding to unbalance said differential transformer, whereby said module initiates actuation of said trip solenoid to trip said first and second breaker contacts open and actuate said switch, said switch then initiating operation of said actuator to precipitate power circuit interruption by said circuit interruptive device.

6. A power distribution circuit ground fault protection system utilizing the ground fault circuit interrupting (GFCI) device of claims 1, 2, 3 or 4; comprising, in combination:
A. a source of control power connected across said first and fourth GFCI device terminals;
B. a circuit interrupting device connected in the power distribution circuit;
C. an actuator operable to initiate power circuit interrupting operation of said interrupting device, said actuator electrically connected across said second and third GFCI device terminals for energization from said control power source through said first and second breaker pole circuits and said first and second breaker contacts therein; and
D. a sensor coupled with the power distribution circuit for developing a signal voltage across said fourth and sixth GFCI device terminals in response to a ground fault on the power distribution circuit, said signal voltage producing a current through said second primary winding to unbalance said differential transformer, whereby said module initiates actuation of said trip solenoid to trip said first and second breaker contacts open and thus initiate operation of said actuator to precipitate power circuit interruption by said circuit interruptive device.

7. A power distribution circuit ground fault protection system utilizing the ground fault circuit interrupting (GFCI) device of claim 1; comprising, in combination:
A. a source of control power connected across said first and fourth GFCI device terminals;
B. a circuit interrupting device connected in the power distribution circuit;
C. an actuator operable to initiate power circuit interrupting operation of said interrupting device, said actuator electrically connected across said fourth and fifth GFCI device terminals for energization from said control power source through said switch;
D. a control load connected across said second and third GFCI device contacts for energization from said control power source through said first and second breaker pole circuits and said first and second breaker contacts therein, whereby a ground fault on the control load circuit downstream from said GFCI device produces a current imbalance in said differential transformer primary windings to which said module responds by initiating, via said solenoid, tripping of said first and second breaker contacts to interrupt said control load circuit and actuation of said switch to initiate, via said actuator, power circuit interruption by said circuit interrupting device; and
E. a sensor coupled with the power distribution circuit for developing a signal voltage across said fourth and sixth GFCI device terminals in response to a ground fault on the power distribution circuit, said signal voltage producing a current through said second primary winding to unbalance said differential transformer, whereby said module initiates tripping of said first and second breaker contacts and actuation of said switch to interrupt said control load circuit and the power distribution circuit.

8. A power distribution circuit ground fault protection system utilizing the ground fault circuit interrupting (GFCI) device of claim 1; comprising, in combination:
A. a source of control power connected across said first and fourth GFCI device terminals;
B. a circuit interrupting device connected in the power distribution circuit;
C. an actuator operable to initiate power circuit interrupting operation of said interrupting device, said actuator electrically connected across said second and third GFCI device terminals for energization from said control power source through said first and second breaker pole circuits and said first and second breaker contacts therein;
D. a control load connected across said second and third GFCI device terminals for energization from said control power source in parallel with said actuator, whereby a ground fault on the control load circuit downstream from said GFCI device produces a current imbalance in said differential transformer primary windings to which said module responds by initiating, via said solenoid, tripping of said first and second breaker contacts to interrupt said control load circuit and said actuator energization circuit, said actuator thereupon operating to precipitate power circuit interruption by said circuit interrupting device; and
E. a sensor coupled with the power distribution circuit for developing a signal voltage across said fourth and sixth GFCI device terminals in response to a ground fault on the power distribution circuit, said signal voltage producing a current through said second primary winding to unbalance said differential transformer, whereby said module initiates tripping of said first and second breaker contacts to likewise interrupt said control load circuit and precipitate power circuit interruption.

* * * * *